US012789588B2

(12) United States Patent
Naito et al.

(10) Patent No.: US 12,789,588 B2
(45) Date of Patent: Nov. 10, 2026

(54) ON-BOARD DEVICE, PROGRAM, AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazutaka Naito, Yokkaichi (JP); Kota Oda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 144 days.

(21) Appl. No.: 18/865,400

(22) PCT Filed: May 2, 2023

(86) PCT No.: PCT/JP2023/017174
§ 371 (c)(1),
(2) Date: Aug. 6, 2025

(87) PCT Pub. No.: WO2023/223848
PCT Pub. Date: Nov. 23, 2023

(65) Prior Publication Data
US 2026/0145485 A1 May 28, 2026

(30) Foreign Application Priority Data
May 20, 2022 (JP) ................................ 2022-083222

(51) Int. Cl.
*B60N 2/56* (2006.01)
*B60H 1/00* (2006.01)
*B60H 1/22* (2006.01)

(52) U.S. Cl.
CPC ....... *B60H 1/2218* (2013.01); *B60H 1/00742* (2013.01); *B60N 2/5642* (2013.01)

(58) Field of Classification Search
USPC ........................................................ 701/36
See application file for complete search history.

(56) References Cited

U.S. PATENT DOCUMENTS 6,179,706 B1 * 1/2001 Yoshinori ............ B60N 2/5657 297/180.14
11,482,019 B2 * 10/2022 Porta ...................... G06V 40/20
(Continued)

FOREIGN PATENT DOCUMENTS

EP 3738802 A1 * 11/2020 ........... B60H 1/0073
JP 2015-134513 A 7/2015
(Continued)

OTHER PUBLICATIONS

International Search Report, Application No. PCT/JP2023/017174, mailed Jul. 11, 2023. ISA/Japan Patent Office.

*Primary Examiner* — Jonathan L Sample
(74) *Attorney, Agent, or Firm* — Brooks Kushman P.C.

(57) ABSTRACT

An in-vehicle device is to be installed in a vehicle and includes a control unit that controls a temperature adjustment device provided in a vehicle seat. The control unit acquires biometric information pertaining to an occupant of the vehicle, acquires a cabin interior temperature of the vehicle, and controls the temperature adjustment device based on the biometric information and the cabin interior temperature that were acquired.

7 Claims, 11 Drawing Sheets

(56) References Cited

U.S. PATENT DOCUMENTS

| | | | | |
|---|---|---|---|---|
| 2004/0070236 | A1* | 4/2004 | Brennan | B60N 2/5685 297/180.13 |
| 2007/0015451 | A1* | 1/2007 | McGrath | B60H 1/00742 340/425.5 |
| 2011/0166747 | A1* | 7/2011 | Wijaya | B60H 1/00742 165/203 |
| 2012/0234932 | A1* | 9/2012 | Okamoto | B60H 1/2218 237/2 R |
| 2015/0127215 | A1* | 5/2015 | Chatterjee | B60H 1/00642 701/1 |
| 2019/0275860 | A1* | 9/2019 | Migneco | B60H 1/00742 |
| 2019/0322154 | A1* | 10/2019 | Ganguly | B60H 1/00742 |
| 2020/0290430 | A1* | 9/2020 | Neveu | B60H 1/00735 |
| 2021/0031786 | A1* | 2/2021 | Gallagher | A61B 5/02055 |
| 2021/0053421 | A1* | 2/2021 | Chiritescu | B60H 1/2218 |
| 2021/0225152 | A1* | 7/2021 | Taylor | G08B 21/22 |
| 2021/0402922 | A1* | 12/2021 | Wincek | B60H 1/00742 |
| 2022/0055448 | A1* | 2/2022 | Lavoie | B60H 1/00771 |
| 2023/0302871 | A1* | 9/2023 | Makita | B60N 2/5657 |

FOREIGN PATENT DOCUMENTS

| | | | | |
|---|---|---|---|---|
| WO | WO-2006000362 | A2 * | 1/2006 | B60N 2/5628 |
| WO | 2013-054574 | A1 | 4/2013 | |
| WO | WO-2022091743 | A1 * | 5/2022 | B60H 1/00285 |

* cited by examiner

| Body temperature threshold setting [first body temperature threshold: 36.6°C, second body temperature threshold: 36.4°C] Cabin temperature threshold setting [first cabin temperature threshold: 30.0°C, second cabin temperature threshold: 20.0°C] | | Occupant body temperature (biometric information) | | |
|---|---|---|---|---|
| | | Second body temperature threshold or less (body temperature ≤ second body temperature threshold | Greater than second body temperature threshold and less than first body temperature threshold (second body temperature threshold < body temperature < first body temperature threshold) | First body temperature threshold or more (first body temperature threshold ≤ body temperature) |
| Cabin interior temperature (ambient temperature) | First cabin temperature threshold or more (first cabin temperature threshold ≤ cabin temperature) | Stopped (not driven) | Seat blower | Seat blower |
| | Greater than second cabin temperature threshold and less than first cabin temperature threshold (second cabin temperature threshold < cabin temperature < first cabin temperature threshold) | Stopped (not driven) | Stopped (not driven) | Stopped (not driven) |
| | Second cabin temperature threshold or less (cabin temperature ≤ second cabin temperature threshold) | Seat heater | Seat heater | Stopped (not driven) |

FIG. 4

ON-BOARD DEVICE, PROGRAM, AND INFORMATION PROCESSING METHOD

CROSS-REFERENCE TO RELATED APPLICATIONS

This application is the U.S. national stage of PCT/JP2023/017174 filed on May 2, 2023, which claims priority of Japanese Patent Application No. JP 2022-083222 filed on May 20, 2022, the contents of which are incorporated herein.

TECHNICAL FIELD

The present disclosure relates to an in-vehicle device, a program, and an information processing method.

BACKGROUND

Vehicle seats provided in vehicles are configured to capable of moving (e.g., sliding) on rails provided on the floor of the vehicle body. As a device for supplying power to a driving unit such as a motor for moving such a vehicle seat, a vehicle seat power supply device is known which includes power receiving coils provided in the vehicle seat and a power supply coil provided on the floor of the vehicle body (e.g., JP 2015-134513A). The vehicle seat power supply device described in JP 2015-134513A has a plurality of power receiving coils, and these power receiving coils are provided in the seat cushion of the vehicle seat and in the armrests or the headrests.

The vehicle seat power supply device in JP 2015-134513A does not give consideration to controlling the driving of a temperature adjustment device, which is provided in the vehicle seat, in accordance with biometric information pertaining to an occupant seated in the vehicle seat.

An object of the present disclosure is to provide an in-vehicle device and the like that can efficiently control a temperature adjustment device provided in a vehicle seat.

SUMMARY

An in-vehicle device according to an aspect of the present disclosure is an in-vehicle device to be installed in a vehicle and comprising a control unit configured to control a temperature adjustment device provided in a vehicle seat, wherein the control unit acquires biometric information pertaining to an occupant of the vehicle, acquires a cabin interior temperature of the vehicle, and controls the temperature adjustment device based on the biometric information and the cabin interior temperature that were acquired.

ADVANTAGEOUS EFFECTS

According to one aspect of the present disclosure, it is possible to provide an in-vehicle device and the like that efficiently controls a temperature adjustment device provided in a vehicle seat.

BRIEF DESCRIPTION OF DRAWINGS

FIG. 4 is an illustrative diagram illustrating an example of a control table.

DETAILED DESCRIPTION OF PREFERRED EMBODIMENTS

Figure 1:
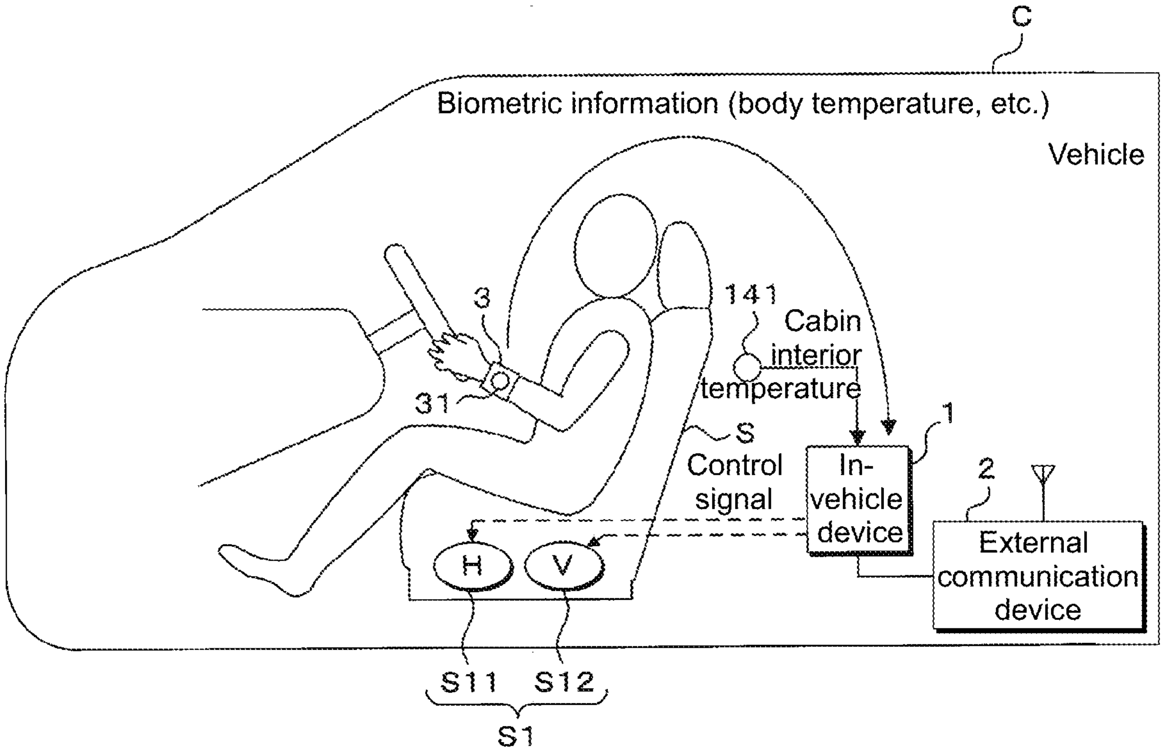
FIG. 1 is a schematic diagram showing the configuration of an in-vehicle system that includes an in-vehicle device according to a first embodiment.

First, embodiments of the present disclosure will be listed and described. Also, at least some of the embodiments described below may be combined as desired.

An in-vehicle device according to an aspect of the present disclosure is an in-vehicle device to be installed in a vehicle and comprising a control unit configured to control a temperature adjustment device provided in a vehicle seat, wherein the control unit acquires biometric information pertaining to an occupant of the vehicle, acquires a cabin interior temperature of the vehicle, and controls the temperature adjustment device based on the biometric information and the cabin interior temperature that were acquired.

According to such an aspect, the control unit of the in-vehicle device acquires biometric information such as the body temperature of the occupant seated in a vehicle seat, and also acquires the cabin interior temperature (ambient temperature) of the vehicle cabin. The control unit of the in-vehicle device performs temperature control with respect to the temperature adjustment device provided in the vehicle seat based on the acquired biometric information (e.g., body temperature) and cabin interior temperature (ambient temperature), and thereby can efficiently control the temperature adjustment device. This eliminates the need for the occupant to manually operate the temperature adjustment device of the vehicle seat, thereby making it possible to eliminate the hassle of performing such operations. In particular, by eliminating the need to operate the temperature adjustment device while the occupant is driving the vehicle, it is possible to help the occupant to concentrate on driving.

The in-vehicle device according to an aspect of the present disclosure may have a configuration in which there are a plurality of the temperature adjustment devices, including a seat heater configured to raise a surface temperature of the vehicle seat and a seat blower configured to blow air through a surface of the vehicle seat, and the control unit identifies, based on a combination of the biometric information and the cabin interior temperature that were acquired, either one of the seat heater and the seat blower, as the temperature adjustment device to be controlled.

According to such an aspect, the temperature adjustment devices provided in the vehicle seat include a seat heater and a seat blower. The seat heater is a heating device having a heat generating element that generates Joule heat when energized, and raises the surface temperature of the vehicle seat, that is to say the seat surface temperature or the backrest temperature. The seat blower (seat ventilator) is an air conditioning device that has a blower fan, and rotates the blower fan to perform temperature adjustment, such as blowing air through ventilation holes or micropores provided in the surface of the vehicle seat to lower the surface temperature. As such, the temperature adjustment devices in the vehicle seat include the seat heater and the seat blower, and can lower the temperature perceived by the occupant by performing heating using the seat heater or blowing air using the seat blower in accordance with the occupant's biometric information (e.g., body temperature) and the cabin interior temperature (ambient temperature). Based on the combination of the acquired biometric information and cabin interior temperature, the control unit of the in-vehicle device identifies either the seat heater or the seat blower as the temperature adjustment device to be controlled, and thus can select and control the driving of the temperature adjustment device that is appropriate according to the state of the occupant and the vehicle interior.

The in-vehicle device according to an aspect of the present disclosure may have a configuration in which the biometric information includes a body temperature of the occupant, in a case where the body temperature of the occupant is a first body temperature threshold or more and the cabin interior temperature is a first cabin temperature threshold or more, the control unit drives the seat blower, in a case where the body temperature of the occupant is a second body temperature threshold or less and the cabin interior temperature is a second cabin temperature threshold or less, the control unit drives the seat heater, the second body temperature threshold is less than the first body temperature threshold, and the second cabin temperature threshold is less than the first cabin temperature threshold.

According to such an aspect, the control unit of the in-vehicle device selectively drives the seat heater or the seat blower using body temperature thresholds for the body temperature of the occupant and cabin temperature thresholds for the cabin interior temperature. The body temperature thresholds include the first body temperature threshold and the second body temperature threshold that is less than the first body temperature threshold, and the cabin temperature thresholds include the first cabin temperature threshold and the second cabin temperature threshold that is less than the first cabin temperature threshold. These thresholds are stored in advance in a predetermined storage area accessible by the control unit, such as a storage unit of the in-vehicle device. The control unit of the in-vehicle device drives the seat blower when the occupant's body temperature is the first body temperature threshold or more and the cabin interior temperature is the first cabin temperature threshold or more, thereby driving the seat blower when the occupant feels relatively hot so as to reduce the temperature perceived by the occupant and improve comfort in the vehicle cabin. The control unit of the in-vehicle device drives the seat heater when the occupant's body temperature is the second body temperature threshold or less and the cabin interior temperature is the second cabin temperature threshold or less, thereby driving the seat heater when the occupant feels relatively cold so as to raise the temperature perceived by the occupant and improve comfort inside the vehicle cabin.

The in-vehicle device according to an aspect of the present disclosure may have a configuration in which in a case where the body temperature of the occupant is greater than the second body temperature threshold and less than the first body temperature threshold, and furthermore the cabin interior temperature is greater than the second cabin temperature threshold and less than the first cabin temperature threshold, the control unit stops the temperature adjustment device.

According to such an aspect, when the occupant's body temperature is greater than the second body temperature threshold and less than the first body temperature threshold, and furthermore the cabin interior temperature is greater than the second cabin temperature threshold and less than the first cabin temperature threshold, the control unit of the in-vehicle device keeps the temperature adjustment device in the stopped state. When the occupant's body temperature is greater than the second body temperature threshold and less than the first body temperature threshold, and furthermore the cabin interior temperature is greater than the second cabin temperature threshold and less than the first cabin temperature threshold, the occupant feels that the temperature is relatively comfortable, and under such a condition, the temperature adjustment device can be stopped to reduce the power consumption of the temperature adjustment device.

The in-vehicle device according to an aspect of the present disclosure may have a configuration in which before the occupant enters the vehicle, the control unit acquires the biometric information from a mobile device in possession of the occupant and starts control of the temperature adjustment device based on the biometric information and the cabin interior temperature that were acquired.

According to such an aspect, the control unit of the in-vehicle device acquires the occupant's biometric information, such as their body temperature, from the mobile device in the possession of the occupant, before the occupant enters the vehicle. The control unit of the in-vehicle device may acquire the occupant's biometric information, such as their body temperature, in conjunction with reception of a remote start signal transmitted from the mobile device. The control unit of the in-vehicle device may start the vehicle upon receiving the remote start signal. The mobile device may be, for example, a smart watch or a smartphone that includes a vital sensor having the functionality of a thermometer or the like, and the in-vehicle device may directly communicate wirelessly with the smart watch or the like. Alternatively, the occupant may hold (carry) a remote start key and a smartphone as the mobile device, and the smartphone and the in-vehicle device may communicate with each other via the remote start key. Alternatively, the remote start key may include a vital sensor and output (transmit) sensed biometric information, such as the body temperature of the occupant, to the in-vehicle device. The control unit of the in-vehicle device acquires the biometric information and the cabin interior temperature (ambient temperature) before the occupant enters the vehicle. Before the occupant enters the vehicle, the control unit of the in-vehicle device starts controlling the temperature adjustment device based on the biometric information and the cabin interior temperature (ambient temperature) that were acquired. As a result, when the occupant enters the vehicle, an environment in which the temperature adjustment device is already being driven can be provided to the occupant, thereby improving comfort within the vehicle cabin.

The in-vehicle device according to an aspect of the present disclosure may have a configuration in which after a predetermined time elapses since the biometric information was acquired, the control unit starts control of the temperature adjustment device based on the biometric information and the cabin interior temperature that were acquired.

In the present embodiment, the control unit of the in-vehicle device begins controlling the temperature adjustment device after the elapse of a predetermined time since the time of acquisition (point of acquisition) of biometric information such as the occupant's body temperature from a mobile device including a smart watch or a remote start key before the occupant enters the vehicle. After the predetermined time has elapsed since acquisition of the biometric information transmitted from the mobile device, the control unit of the in-vehicle device starts to control the temperature adjustment device based on the biometric information and the cabin interior temperature that were acquired, thereby making it possible to suppress excessive driving of the temperature adjustment device before the occupant enters the vehicle, and also reduce power consumption of the temperature adjustment device. The predetermined time used to start control of the temperature adjustment device may be stored, for example, in a storage unit of the in-vehicle device, and may be determined based on the entrance time, which is the time from when the biometric information is transmitted by the occupant operating a remote start key or the like (corresponding to the time of acquisition) to when the occupant enters the vehicle. Before the occupant enters the vehicle, the control unit of the in-vehicle device regularly performs processing to calculate the time (entrance time) from when the occupant's biometric information, such as their body temperature, is acquired from the mobile device including a smart watch or remote start key until when the occupant enters (enters) the vehicle. The calculated entrance time may be stored as log information or the like in a storage unit of the in-vehicle device, and the control unit of the in-vehicle device may acquire the entrance time (X minutes) by referring to the storage unit. The control unit of the in-vehicle device may store, for example, history information including an operation log indicating operation of the remote start key or the like by the occupant and a riding log obtained according to occupancy of the driver's seat or according to a seating sensor of the vehicle seat, and store an entrance time calculated using such log information in the storage unit. When the control unit of the in-vehicle device selectively drives the seat blower (seat ventilator) as the temperature adjustment device, the control unit of the in-vehicle device may start acquiring the cabin interior temperature and driving the seat blower after the entrance time (X minutes) has elapsed since when the biometric information was acquired. When the control unit of the in-vehicle device selectively drives the seat heater as the temperature adjustment device, the control unit of the in-vehicle device may subtract the initialization time of the seat heater (Y minutes) from the entrance time (X minutes) and start acquiring the cabin interior temperature and driving the seat heater after the calculated time (X−Y minutes) has elapsed since when the biometric information was acquired. The initialization time (Y minutes) of the seat heater is shorter than the entrance time (X minutes), that is to say $Y<X$, and corresponds to the time from when driving of the seat heater starts to when a specified temperature is reached, and is determined according to the product characteristics of the seat heater. In this way, by using a different predetermined time until control of the temperature adjustment device is started depending on the type of temperature adjustment device selected, it is possible to perform drive control that corresponds to the functional characteristics of the temperature adjustment device.

The in-vehicle device according to an aspect of the present disclosure may have a configuration in which the temperature adjustment device includes a seat heater configured to raise a surface temperature of the vehicle seat, the control unit controls the seat heater such that the surface temperature of the vehicle seat reaches a first set temperature, and in a case where a distance between the vehicle and the occupant becomes a predetermined distance or less, the control unit controls the seat heater such that the surface temperature of the vehicle seat reaches a second set temperature higher than the first set temperature.

According to such an aspect, before the occupant enters the vehicle, the control unit of the in-vehicle device acquires the occupant's biometric information, such as their body temperature, from a mobile device including a smart watch or a remote start key, and further acquires the cabin interior temperature (ambient temperature), and selects either the seat heater or the seat blower based on the biometric information (e.g., body temperature) and the cabin interior temperature that were acquired. When the control unit of the in-vehicle device selects the seat heater, the control unit starts the driving of the seat heater and controls the seat heater such that the surface temperature of the vehicle seat reaches the first set temperature. Even after starting to drive the seat heater, the control unit of the in-vehicle device continues to communicate with the mobile device carried by the occupant, and periodically repeats the detection of the position of the mobile device, thereby deriving the distance between the occupant and the vehicle. When detecting the position of the occupant, the control unit of the in-vehicle device may utilize, for example, a response function of a remote start key using LF waves or the like, a beacon system, or position detection performed using UWB (Ultra Wide Band). Alternatively, an in-vehicle ECU, such as a body ECU, may derive the distance between the vehicle and a mobile device, such as a smart key, carried by the occupant, and the control unit of the in-vehicle device may periodically acquire the distance from the in-vehicle ECU. When the distance between the vehicle and the mobile device (occupant) becomes the predetermined distance or less, the control unit of the in-vehicle device increases (raises) the output of the seat heater and controls the seat heater to reach the second set temperature that is higher than the first set temperature. As a result, when driving of the seat heater is initially started, heating of the vehicle seat is started at the first set temperature, which is a relatively low temperature setting, and then when the occupant in possession of the mobile device approaches the vehicle, for example reaches a location within about 10 m of the vehicle (when the distance becomes the predetermined distance or less), the seat heater can be operated at the second set temperature that is higher than the first set temperature. By controlling the operation of the seat heater using such set temperature steps, it is possible to reduce power consumption of the seat heater, while at the same time raising the set temperature when the occupant approaches the vehicle, thereby providing the occupant with an in-vehicle environment with an appropriately adjusted temperature, thereby improving comfort in the vehicle cabin.

A program according to an aspect of the present disclosure causes a computer to perform processing, the computer being installed in a vehicle and configured to control a temperature adjustment device provided in a vehicle seat, the processing including: acquiring biometric information pertaining to an occupant of the vehicle; acquiring a cabin interior temperature of the vehicle; and controlling the temperature adjustment device based on the biometric information and the cabin interior temperature that were acquired.

According to such an aspect, it is possible to provide a program that causes a computer to function as an in-vehicle device that can efficiently control a temperature adjustment device provided in a vehicle seat.

An information processing method according to an aspect of the present disclosure causes a computer to perform processing, the computer being installed in a vehicle and configured to control a temperature adjustment device provided in a vehicle seat, the processing including: acquiring biometric information pertaining to an occupant of the vehicle; acquiring a cabin interior temperature of the vehicle; and controlling the temperature adjustment device based on the biometric information and the cabin interior temperature that were acquired.

According to such an aspect, it is possible to provide an information processing method that causes a computer to function as an in-vehicle device that can efficiently control a temperature adjustment device provided in a vehicle seat.

An in-vehicle device 1 according to embodiments of the present disclosure will be described below with reference to the drawings. It should be noted that the present disclosure is not limited to these examples, but rather is intended to include all modifications within the scope and meaning equivalent to the claims.

First Embodiment

Figure 2:
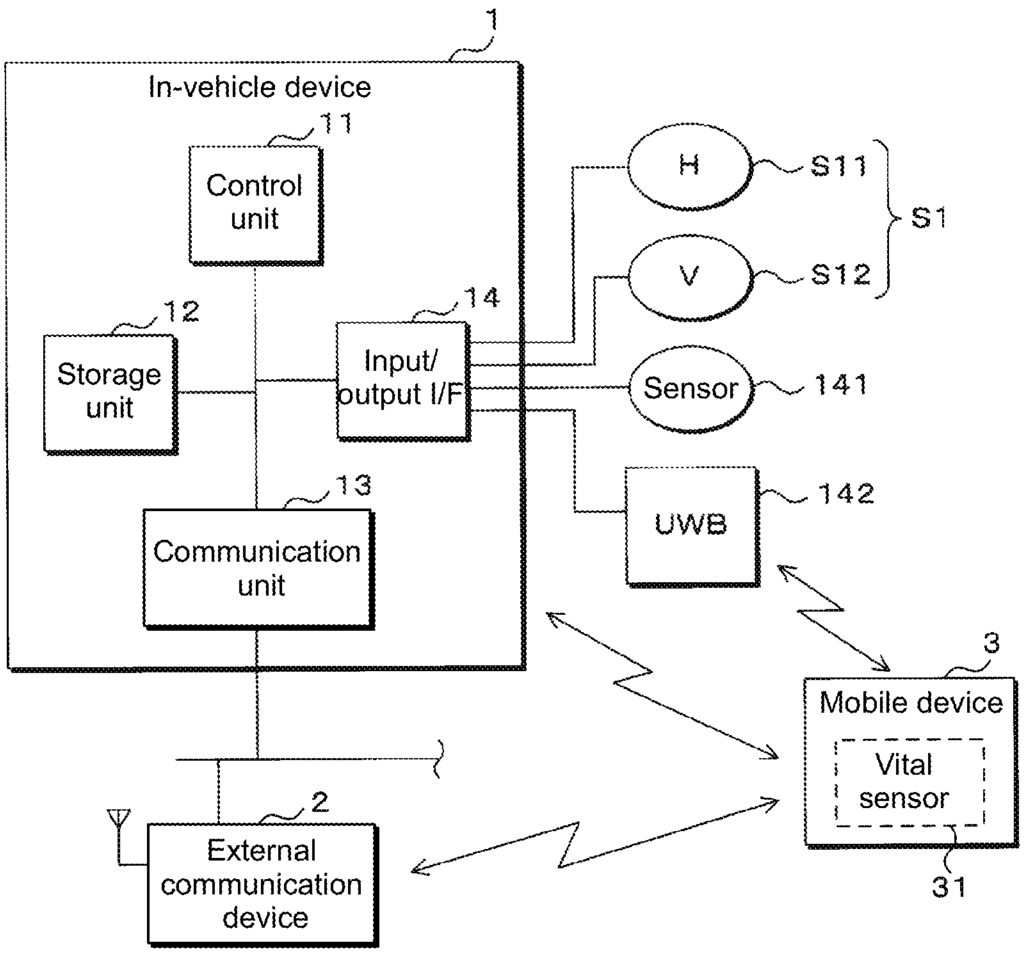
FIG. 2 is a block diagram showing a configuration of the in-vehicle device.

Hereinafter, an embodiment will be described with reference to the drawings. FIG. 1 is a schematic diagram showing the configuration of an in-vehicle system that includes an in-vehicle device 1 according to a first embodiment. FIG. 2 is a block diagram showing the configuration of the in-vehicle device 1. The in-vehicle system has a configuration in which the main device is the in-vehicle device 1 installed in a vehicle C, and temperature adjustment devices S1, including a seat heater S11 and a seat blower S12 (seat ventilator), are communicatively connected to the in-vehicle device 1. The in-vehicle device 1 controls operation of the seat heater S11 and the seat blower S12 (seat ventilator), which are provided in a vehicle seat S, based on biometric information pertaining to an occupant and acquired from a mobile device 3, which includes a vital sensor 31, and the cabin interior temperature (ambient temperature) obtained from a temperature sensor 141.

The in-vehicle device 1 is also connected to an external communication device 2, and may perform communication with the mobile device 3 via the external communication device 2 even when the mobile device 3 carried by the occupant is outside the vehicle C (away from the vehicle). The external communication device 2 includes an external communication unit (not shown) and an input/output I/F (interface) 14 (not shown) for performing communication with the in-vehicle device 1. The external communication unit is a communication device for performing wireless communication using a mobile communication protocol such as 3G, LTE, 4G, 5G, or WiFi, and transmits and receives data with the mobile device 3 via an antenna connected to the external communication unit. The communication between the external communication device 2 and the mobile device 3 may be performed via an external network such as a public line network or the Internet. The external communication device 2 and the in-vehicle device 1 are communicatively connected via an in-vehicle network, and the in-vehicle device 1 may communicate with the mobile device 3 via the external communication device 2. The communication path between the in-vehicle device 1 and the mobile device 3 is not limited to communication performed via the external communication device 2, and may be short range communication performed using a communication unit 13 included in the in-vehicle device 1, or wireless communication performed via a wireless transceiver 142 that is compatible with UWB (Ultra Wide Band) or the like and connected to the input/output I/F 14 of the in-vehicle device 1.

The in-vehicle device 1 includes the control unit 11, a storage unit 12, the communication unit 13, and the input/output I/F 14, and may be, for example, an integrated ECU configured by a central control device such as a vehicle computer. Alternatively, the in-vehicle device 1 may be a body ECU that controls body actuators such as wipers or door mirrors.

The control unit 11 is constituted by a CPU (Central Processing Unit) or an MPU (Micro Processing Unit) and performs various types of control processing and arithmetic processing by reading out and executing a program P (program product) and data stored in advance in the storage unit 12. The control unit 11 is not limited to a software processing unit that performs software processing, such as a CPU, and may also include a hardware processing unit that performs various types of control processing and arithmetic processing using hardware processing, such as an FPGA, an ASIC, or an SOC.

The storage unit 12 is constituted by a volatile memory element such as a RAM (Random Access Memory) or a non-volatile memory element such as a ROM (Read Only Memory), an EEPROM (Electrically Erasable Programmable ROM), or a flash memory, and has stored therein in advance the program P (program product) and data to be referenced during processing. The program P (program product) stored in the storage unit 12 may be the program P (program product) read out from a recording medium readable by the control unit 11 of the in-vehicle device 1. Moreover, the program P (program product) may be downloaded from an external computer (not shown) connected to a communication network (not shown) and stored in the storage unit 12. A control table used when controlling the temperature adjustment devices S1 is also stored in the storage unit 12. The control table will be described in detail later.

The input/output I/F 14 is, for example, a communication interface for serial communication. The in-vehicle device 1 is communicatively connected to the temperature adjustment devices S1, which include the seat heater S11 and the seat blower S12 (seat ventilator), via the input/output I/F 14 and a wire harness such as a serial cable.

The temperature sensor 141 and the wireless transceiver 142 may also be connected to the input/output I/F 14. The temperature sensor 141 is disposed in the vehicle cabin of the vehicle C, and periodically or regularly detects (senses) the temperature (ambient temperature) in the vehicle cabin and outputs the detected temperature to the in-vehicle device 1. The wireless transceiver 142 is a communication interface having a function for performing wireless communication using, for example, LF waves, RF waves, or UWB. The in-vehicle device 1 may perform wireless communication with a smart key or a remote start key via the wireless transceiver 142, using LF waves, RF waves, UWB, or the like.

The communication unit 13 is a communication interface that uses, for example, a communication protocol such as CAN (Control Area Network) or Ethernet (registered trademark), and the control unit 11 communicates with the external communication device 2 connected to the in-vehicle network via the communication unit 13. The communication unit 13 is not limited to a communication interface compatible with wired communication, and may be, for example, a communication interface compatible with wireless communication performed using WiFi (registered trademark) or ZiGBee (registered trademark). In this way, the in-vehicle device 1 includes communication interfaces compatible with a plurality of communication paths, including the communication unit 13 and the wireless transceiver 142, and may use any of the communication interfaces to communicate with the mobile device 3, which may be a smart watch, a remote start key, or the like.

The temperature adjustment devices S1 are provided inside a vehicle seat S, and include, for example, the seat heater S11 and the seat blower S12. The seat heater S11 is, for example, a heating device provided with a heat generating element that generates Joule heat when supplied with power. The seat heater S11 raises the surface temperature of the vehicle seat S, that is, the seat surface temperature or the backrest temperature. The seat blower S12 (seat ventilator) is, for example, an air conditioning device that includes a blower fan. The seat blower S12 (seat ventilator) rotates the blower fan to perform temperature adjustment, such as blowing air through ventilation holes or micropores provided in the surface of the vehicle seat S to lower the surface temperature. The seat heater S11 and the seat blower S12 are communicatively connected to the in-vehicle device 1 via a wire harness or the like, and are driven in response to control signals output from the in-vehicle device 1.

The mobile device 3 is an information terminal held (carried) by an occupant who rides in the vehicle C, and is constituted by, for example, a smart watch, a smartphone, or smart glasses, and includes a control unit, a storage unit, and a communication unit, similarly to the in-vehicle device 1. The mobile device 3 includes a vital sensor 31 that measures the body temperature, heart rate, or blood pressure of the occupant in possession of the mobile device 3. The vital sensor 31 functions as a thermometer, a heart rate meter, or a blood pressure meter that measures biometric information (vital data) of the occupant in possession of the mobile device 3. The mobile device 3 transmits, to the in-vehicle device 1, biometric information indicating, for example, a body temperature sensed by the included vital sensor 31. Thus, the biometric information (vital data) may be a body temperature, a heart rate, a blood pressure, or a combination thereof.

The mobile device 3 is not limited to being configured by a standalone device such as a smart watch, and may be configured by a combination of a smart watch or the like with a smart key or a remote start key. A remote start key is a device that communicates with the in-vehicle device 1 using LF waves and RF waves, and can start up the vehicle C and operate various in-vehicle devices installed in the vehicle C from outside the vehicle C in response to operations performed by the occupant, and may also be a smart key with a verification function or the like. The smart watch may transmit sensed biometric information such as the body temperature to the remote start key or the like, and the remote start key may transmit the biometric information to the in-vehicle device 1 using LF waves, UWB, or the like. Alternatively, the remote start key may include the vital sensor 31 and output (transmit) sensed biometric information such as the body temperature of the occupant to the in-vehicle device 1. In this case, the remote start key functions as the mobile device 3.

In this way, the mobile device 3 may be in the form of a standalone device such as a smart watch or remote start key that includes the vital sensor 31 and has a communication function for communication with the in-vehicle device 1, or in the form of a combination of a smart watch or the like that includes the vital sensor 31 with a remote start key or the like. The in-vehicle device 1 may detect the position of the occupant in possession of the remote start key or the like, or derive the distance between the occupant and the vehicle C, by periodically communicating with the remote start key or the like.

Figure 3:
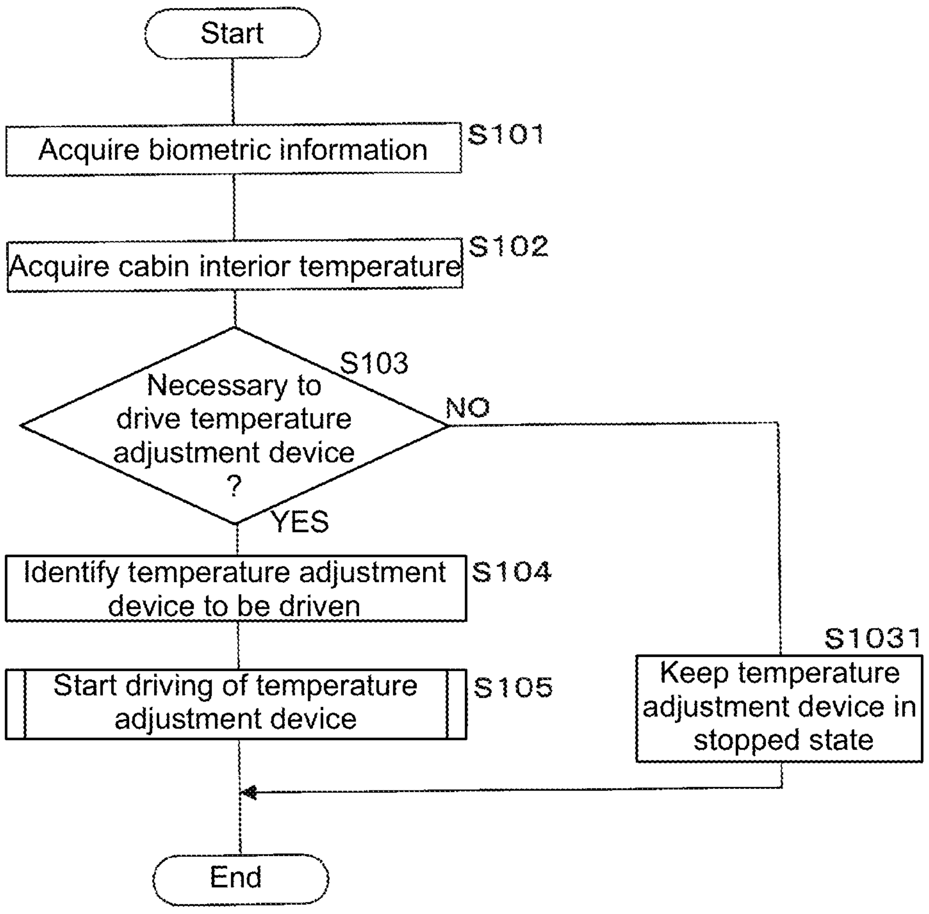
FIG. 3 is a flowchart showing processing performed by a control unit of the in-vehicle device.

FIG. 3 is a flowchart showing processing of the control unit 11 of the in-vehicle device 1. The control unit 11 of the in-vehicle device 1 regularly performs the following processing when, for example, the vehicle C is in the running state (the IG switch is on) or in the stopped state (the IG switch is off). When performing the following processing, the control unit 11 of the in-vehicle device 1 may perform verification processing with a smart key or a remote start key carried by the occupant. The control unit 11 of the in-vehicle device 1 may start up the vehicle C when the result of the verification processing is affirmative and the IG switch is turned on. When the vehicle C is started up, the engine is started, the HV system is started, or the EV system is started.

The control unit 11 of the in-vehicle device 1 acquires biometric information pertaining to an occupant in the vehicle C (S101). The control unit 11 of the in-vehicle device 1 communicates with the mobile device 3 carried by the occupant via the communication unit 13 or the wireless transceiver 142, and acquires biometric information such as the body temperature of the occupant from the mobile device 3. The mobile device 3 is, for example, a smart watch or a smartphone that includes the vital sensor 31 having the functionality of a thermometer or the like, and the in-vehicle device 1 may directly communicate wirelessly with the smart watch or the like. Alternatively, the smart watch or the like may output biometric information to the smart key or the remote start key carried by the occupant, and the smart key or the like may communicate with the control unit 11 of the in-vehicle device 1 and transmit the biometric information (e.g., body temperature) to the in-vehicle device 1. Alternatively, the smart key or the remote start key may include the vital sensor 31 and transmit the sensed biometric information (e.g., body temperature) to the in-vehicle device 1. In this way, the mobile device 3 may be configured not only by a smart watch that includes the vital sensor 31, but also by a combination of the smart watch or the like and a remote start key or the like, or by a remote start key that includes the vital sensor 31. The control unit 11 of the in-vehicle device 1 may periodically acquire biometric information pertaining to the occupant from the mobile device 3 carried by the occupant, associate the acquired pieces of biometric information with corresponding times of acquisition, and store such information in the storage unit 12 as history information (log data).

The control unit 11 of the in-vehicle device 1 acquires the cabin interior temperature of the vehicle C (S102). The control unit 11 of the in-vehicle device 1 acquires the cabin interior temperature (ambient temperature) in the compartment where the vehicle seat S is located by, for example, acquiring temperature data output from the temperature sensor 141 connected to the input/output I/F 14. The temperature sensor 141 is provided inside the vehicle cabin, and outputs temperature data, which is sensed data, to the in-vehicle device 1 periodically or regularly. The control unit 11 of the in-vehicle device 1 may periodically acquire the cabin interior temperature (ambient temperature) from the temperature sensor 141, associate the acquired cabin interior temperatures with corresponding times of acquisition, and store such information in the storage unit 12 as history information (log data).

The control unit 11 of the in-vehicle device 1 determines whether or not it is necessary to drive a temperature adjustment device S1, based on the acquired biometric information and cabin interior temperature (S103). When it is determined that it is necessary to drive a temperature adjustment device S1 (S103: YES), the control unit 11 of the in-vehicle device 1 identifies the temperature adjustment device S1 that is to be driven (S104). The control unit 11 of the in-vehicle device 1 may, for example, refer to a control table stored in the storage unit 12 to determine whether or not it is necessary to drive a temperature adjustment device S1, and if driving is necessary, select (identify) the temperature adjustment device S1 that is to be driven.

FIG. 4 is an illustrative diagram illustrating an example of the control table. The storage unit 12 of the in-vehicle device 1 stores control information for determining whether or not it is necessary to drive a temperature adjustment device S1, based on the acquired biometric information and cabin interior temperature, and for, if driving is necessary, identifying which of the temperature adjustment devices S1 is to be driven, and the control information is stored, for example, in a matrix-format control table.

The control table includes body temperature threshold control items (horizontal axis items) and cabin temperature threshold control items (vertical axis items), and based on combinations of thresholds set for the control items, it is determined whether or not a temperature adjustment device S1 needs to be driven, and which temperature adjustment device S1 (the seat heater S11 or the seat blower S12) is to be selected. A body temperature threshold setting and a cabin temperature threshold setting are also stored in the storage unit 12 along with the control table. The body temperature threshold setting includes a first body temperature threshold and a second body temperature threshold, and the second body temperature threshold (e.g., 36.4° C.) is set lower than the first body temperature threshold (e.g., 36.6° C.). The cabin temperature threshold setting includes a first cabin temperature threshold and a second cabin temperature threshold, and the second cabin temperature threshold (e.g., 20.0° C.) is set lower than the first cabin temperature threshold (e.g., 30.0° C.).

The following three items are defined as body temperature threshold control items (horizontal axis items): less than or equal to the second body temperature threshold (body temperature≤second body temperature threshold), greater than the second body temperature threshold and less than the first body temperature threshold (second body temperature threshold<body temperature<first body temperature threshold), and greater than or equal to the first body temperature threshold (first body temperature threshold≤body temperature). The following three items are defined as cabin temperature threshold control items (vertical axis items): greater than or equal to the first cabin temperature threshold (first cabin temperature threshold≤cabin temperature), greater than the second cabin temperature threshold and less than the first cabin temperature threshold (second cabin temperature threshold<cabin temperature<first cabin temperature threshold), and less than or equal to the second cabin temperature threshold (cabin temperature≤second cabin temperature threshold).

For example, when the cabin interior temperature (ambient temperature) is greater than the second cabin temperature threshold and less than the first cabin temperature threshold, the control unit 11 of the in-vehicle device 1 determines that it is not necessary to drive a temperature adjustment device S1 (stopped/not driven). Also, for example, when the cabin interior temperature (ambient temperature) is greater than or equal to the first cabin temperature threshold, and the occupant's body temperature (biometric information) is less than or equal to the second body temperature threshold, the control unit 11 of the in-vehicle device 1 determines that it is not necessary to drive a temperature adjustment device S1 (stopped/not driven). Also, for example, when the cabin interior temperature (ambient temperature) is less than or equal to the second cabin temperature threshold, and the occupant's body temperature (biometric information) is greater than or equal to the first body temperature threshold, the control unit 11 of the in-vehicle device 1 determines that it is not necessary to drive a temperature adjustment device S1 (stopped/not driven).

For example, when the cabin interior temperature (ambient temperature) is greater than or equal to the first cabin temperature threshold, and the occupant's body temperature (biometric information) is greater than the second body temperature threshold and less than the first body temperature threshold, or is greater than or equal to the first body temperature threshold, the control unit 11 of the in-vehicle device 1 determines that it is necessary to operate a temperature adjustment device S1, and identifies (selects) the seat blower S12. For example, when the cabin interior temperature (ambient temperature) is less than or equal to the second cabin temperature threshold, and the occupant's body temperature (biometric information) is greater than the second body temperature threshold and less than the first body temperature threshold, or is less than or equal to the second body temperature threshold, the control unit 11 of the in-vehicle device 1 determines that it is necessary to operate a temperature adjustment device S1, and identifies (selects) the seat heater S11.

Such setting performed according to the control table illustrated in the present embodiment is merely an example, and the present disclosure is not limited to this. Unlike the present embodiment, the determination regarding need for a temperature adjustment device S1 and the identification of a temperature adjustment device S1 (seat heater S11 or seat blower S12) may be performed according to combinations of body temperature threshold control items and cabin temperature threshold control items. Although the control items defined in the control table pertain to a body temperature threshold, the present disclosure is not limited to this, and the control items may pertain to a threshold related to heart rate or blood pressure (heart rate threshold, threshold blood pressure), or a combination thereof.

The setting information, the body temperature threshold settings, and the cabin temperature threshold settings defined in the control table may be changed in response to operations performed by an occupant of the vehicle C. A configuration is possible in which the control unit 11 of the in-vehicle device 1 outputs a setting change screen, which is for accepting changes to the setting information, to the mobile device 3 communicatively connected to the in-vehicle device 1, or to an HMI device such as a display device, via the communication unit 13, and change the setting information of the control table or the like in accordance with the information input to the setting change screen.

The control of driving of the seat heater S11 or the seat blower S12 may be performed using a more detailed matrix by increasing the number of items defined as control items for the body temperature threshold and the cabin temperature threshold and increasing the number of threshold stages. If the seat heater S11 and the seat blower S12 have a plurality of operating setting levels (Hi setting, Mid setting, and Lo setting), the number of threshold stages may be increased, and the driving of the seat heater S11 and the seat blower S12 may be control in accordance with the setting levels.

In the present embodiment, the control unit 11 of the in-vehicle device 1 performs the above-described processing by referring to the control table, but the present disclosure is not limited to this. Needless to say, the determination of whether or not it is necessary to drive a temperature adjustment device S1, the selection of the seat heater S11 or the seat blower S12, and the like may be performed by decision branch processing that uses CASE or “if” statements or the like. Furthermore, if the control table includes a control item defining a heart rate threshold or a threshold blood pressure, the control unit 11 of the in-vehicle device 1 may perform determination, control, and the like based on the occupant’s heart rate, blood pressure, or a combination thereof, similarly to the case of using the occupant’s body temperature.

When it is determined that it is not necessary (NO) to drive a temperature adjustment device S1 (S103: NO), the control unit 11 of the in-vehicle device 1 does not drive the temperature adjustment devices S1, and keeps the temperature adjustment devices S1 in the stopped state (S1031). For example, the control unit 11 of the in-vehicle device 1 refers to the control table, and when the control mode that corresponds to the acquired combination of biometric information and cabin interior temperature corresponds to “stopped (not driven)”, the control unit 11 does not drive the temperature adjustment devices S1 (seat heater S11 and seat blower S12), and keeps the temperature adjustment devices S1 in the stopped state. In other words, when the control mode that corresponds to the acquired combination of biometric information and cabin interior temperature corresponds to “stopped (not driven)”, the control unit 11 of the in-vehicle device 1 may not perform any active processing on the temperature adjustment devices S1.

The control unit 11 of the in-vehicle device 1 starts driving of the identified temperature adjustment device S1 (S105). The control unit 11 of the in-vehicle device 1 starts driving of the seat heater S11 or the seat blower S12 (seat ventilator) in accordance with the type of temperature adjustment device S1 that was identified (selected). The control of the driving of the seat heater S11 or the seat blower S12 will be described with reference to the processing flow showing the corresponding subroutine.

Figure 5:
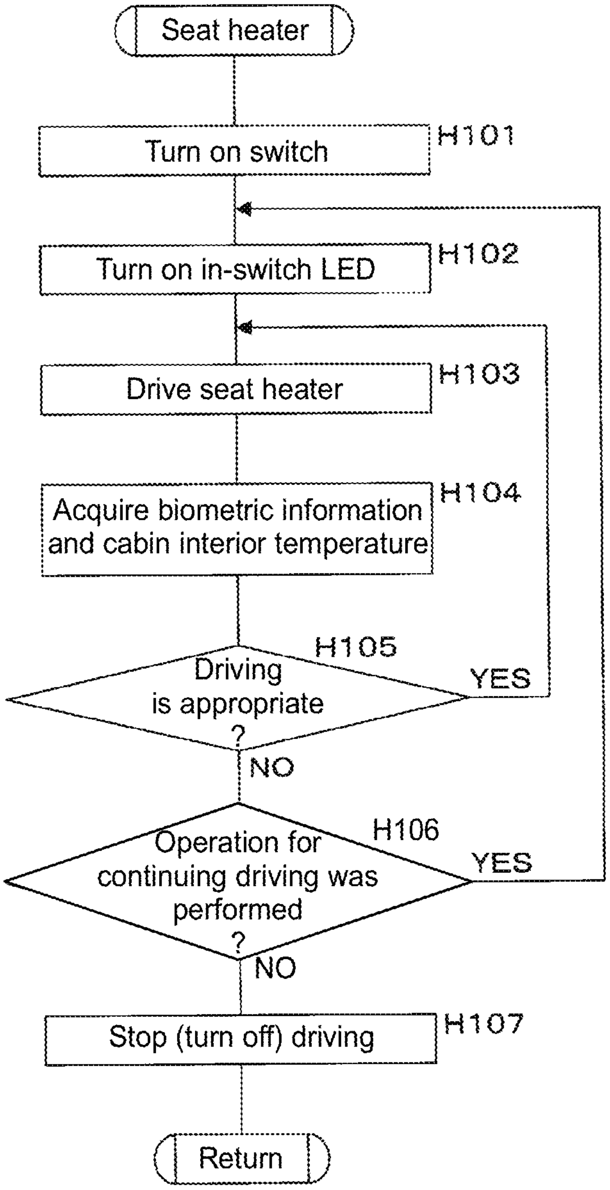
FIG. 5 is a flowchart showing processing that the control unit of the in-vehicle device performs with respect to a seat heater.

FIG. 5 is a flowchart showing processing that the control unit 11 of the in-vehicle device 1 performs with respect to the seat heater S11. Upon identifying (selecting) the seat heater S11 as the temperature adjustment device S1 to be driven, the control unit 11 of the in-vehicle device 1 executes the following processing flow.

The control unit 11 of the in-vehicle device 1 performs switch ON control to start up the seat heater S11 (H101). For example, the control unit 11 of the in-vehicle device 1 transmits a control signal to the seat heater S11 via the input/output I/F 14 to perform switch ON control and start (activate) driving of the seat heater S11. If the output level of the seat heater S11 includes, for example, a Hi setting (high output), a Mid setting (medium output), and a Lo setting (low output), the control unit 11 of the in-vehicle device 1 may activate the seat heater S11 at the Hi setting.

The control unit 11 of the in-vehicle device 1 turns on a designated number of in-switch LEDs of the seat heater S11 (H102). For example, the control unit 11 of the in-vehicle device 1 may turn on a designated number of in-switch LEDs in accordance with the output level of the seat heater S11, such as turning on three LEDs according to the Hi setting, turning on two LEDs according to the Mid setting, and turning on one LED according to the Lo setting.

The control unit 11 of the in-vehicle device 1 drives the seat heater S11 (H103). The seat heater S11 is driven in response to a control signal transmitted from the control unit 11 of the in-vehicle device 1, and thereby starts heating (temperature adjustment) the vehicle seat S.

The control unit 11 of the in-vehicle device 1 acquires the occupant’s biometric information and the cabin interior temperature (H104). Similarly to the above-described processing in steps S101 and S102, the control unit 11 of the in-vehicle device 1 again acquires the occupant’s biometric information (e.g., body temperature) and the cabin interior temperature (ambient temperature). This processing is repeated in a loop, and the control unit 11 of the in-vehicle device 1 repeatedly performs the processing of acquiring the occupant’s biometric information and the cabin interior temperature at a predetermined cycle.

The control unit 11 of the in-vehicle device 1 determines whether or not driving of the seat heater S11 is appropriate (H105). Similarly to the above-described processing of step S103, the control unit 11 of the in-vehicle device 1 refers to the control table stored in the storage unit 12, for example, and determines whether or not driving of the seat heater S11 is appropriate based on the occupant’s biometric information (e.g., body temperature) and the cabin interior temperature (ambient temperature) that were most recently acquired. In this way, even after driving of the seat heater S11 has started, it is possible to efficiently determine whether or not it is appropriate to continue driving the seat heater S11 or whether or not the temperature (heated state) of the seat is appropriate based on newly acquired biometric information (e.g., body temperature) and cabin interior temperature (ambient temperature). If it is determined that the driving of the seat heater S11 is appropriate (H105: YES), that is, if the temperature (heated state) of the seat is appropriate, the loop processing is performed to execute the processing of step H103 again. As a result, heating by the seat heater S11 is continued.

When it is determined that the driving of the seat heater S11 is not appropriate (H105: NO), the control unit 11 of the in-vehicle device 1 determines whether or not an operation has been performed to change the intensity of the seat heater S11 and continue heating (H106). If it is determined that an operation to continue heating has been performed (H106: YES), the control unit 11 of the in-vehicle device 1 changes the intensity of the seat heater S11 in accordance with a designated level selected by the occupant, and performs loop processing to execute the processing from H102 again.

When it is determined that an operation to continue heating has not been performed (H106: NO), the control unit 11 of the in-vehicle device 1 stops driving (turns off) the seat heater S11 in accordance with a manual operation to turn off the seat heater S11 or receiving an off control signal indicating automatic turn-off (H107). Alternatively, if a control signal corresponding to a manual operation performed by an occupant, such as changing the output intensity (designated level) of the seat heater S11 or turning it off, is not received, the control unit 11 of the in-vehicle device 1 may perform loop processing to again execute processing from step S101.

Figure 6:
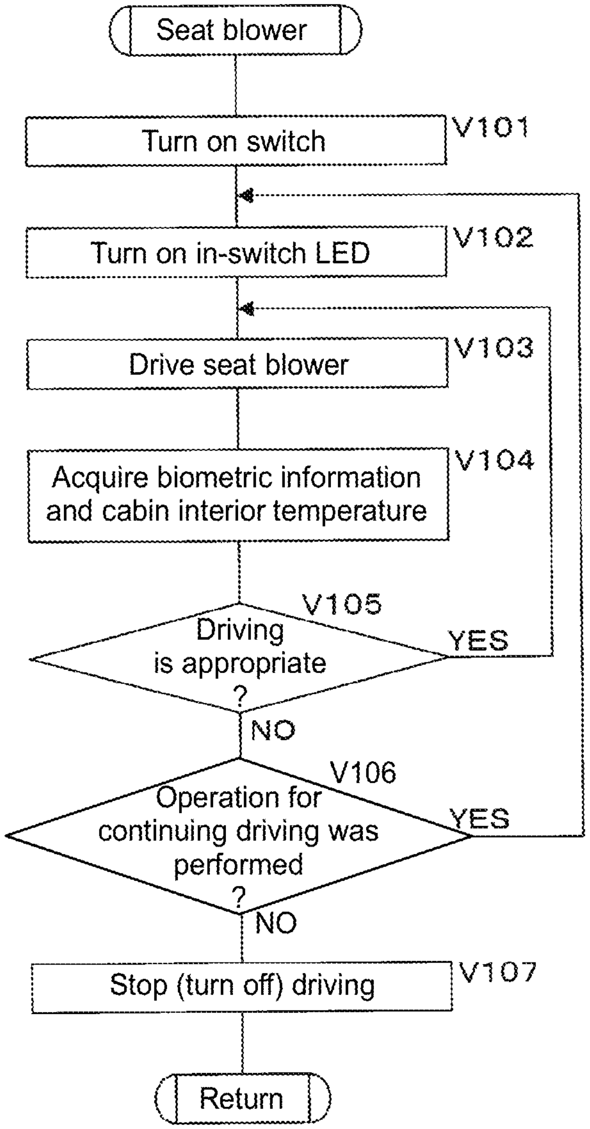
FIG. 6 is a flowchart showing processing that the control unit of the in-vehicle device performs with respect to a seat blower.

FIG. 6 is a flowchart showing processing that the control unit 11 of the in-vehicle device 1 performs with respect to the seat blower S12. Upon identifying (selecting) the seat blower S12 (seat ventilator) as the temperature adjustment device S1 to be driven, the control unit 11 of the in-vehicle device 1 executes the following processing flow.

The control unit 11 of the in-vehicle device 1 performs switch ON control to start up the seat blower S12 (V101). For example, the control unit 11 of the in-vehicle device 1 transmits a control signal to the seat blower S12 via the input/output I/F 14 to perform switch ON control and start (activate) driving of the seat blower S12. If the output level of the seat blower S12 includes, for example, a Hi setting (high output), a Mid setting (medium output), and a Lo setting (low output), the control unit 11 of the in-vehicle device 1 may activate the seat blower S12 at the Hi setting.

The control unit 11 of the in-vehicle device 1 turns on a designated number of in-switch LEDs of the seat blower S12 (V102). For example, the control unit 11 of the in-vehicle device 1 may turn on a designated number of in-switch LEDs in accordance with the output level of the seat blower S12, such as turning on three LEDs according to the Hi setting, turning on two LEDs according to the Mid setting, and turning on one LED according to the Lo setting.

The control unit 11 of the in-vehicle device 1 drives the seat blower S12 (V103). The seat blower S12 is driven in response to a control signal transmitted from the control unit 11 of the in-vehicle device 1, and thereby starts blowing (temperature adjustment) with respect to the vehicle seat S.

The control unit 11 of the in-vehicle device 1 acquires the occupant's biometric information and the cabin interior temperature (V104). Similarly to the above-described processing in steps S101 and S102, the control unit 11 of the in-vehicle device 1 again acquires the occupant's biometric information (e.g., body temperature) and the cabin interior temperature (ambient temperature). This processing is repeated in a loop, and the control unit 11 of the in-vehicle device 1 repeatedly performs the processing of acquiring the occupant's biometric information and the cabin interior temperature at a predetermined cycle.

The control unit 11 of the in-vehicle device 1 determines whether or not driving of the seat blower S12 is appropriate (V105). Similarly to the above-described processing of step S103, the control unit 11 of the in-vehicle device 1 refers to the control table stored in the storage unit 12, for example, and determines whether or not it is appropriate to drive the seat blower S12 based on the occupant's biometric information (e.g., body temperature) and the cabin interior temperature (ambient temperature) that were most recently acquired. In this way, even after driving of the seat blower S12 has started, it is possible to efficiently determine whether or not it is appropriate to continue driving the seat blower S12 or whether or not the temperature (ventilated state) of the seat is appropriate based on newly acquired biometric information (e.g., body temperature) and cabin interior temperature (ambient temperature). If it is determined that the driving of the seat blower S12 is appropriate (V105: YES), that is, if the temperature (ventilated state) of the seat is appropriate, the loop processing is performed to execute the processing of step V103 again. As a result, ventilation by the seat blower S12 is continued.

When it is determined that the driving of the seat blower S12 is not appropriate (V105: NO), the control unit 11 of the in-vehicle device 1 determines whether or not an operation has been performed to change the intensity of the seat blower S12 and continue ventilation (V106). If it is determined that an operation to continue ventilation has been performed (V106: YES), the control unit 11 of the in-vehicle device 1 changes the intensity of the seat blower S12 in accordance with a designated level selected by the occupant, and performs loop processing to execute the processing from V102 again.

When it is determined that an operation to continue ventilation has not been performed (V106: NO), the control unit 11 of the in-vehicle device 1 stops driving (turns off) the seat blower S12 in accordance with a manual operation to turn off the seat blower S12 or receiving an off control signal indicating automatic turn-off (V107). Alternatively, if a control signal corresponding to a manual operation performed by an occupant, such as changing the output intensity (designated level) of the seat blower S12 or turning it off, is not received, the control unit 11 of the in-vehicle device 1 may perform loop processing to again execute processing from step S101.

Second Embodiment

Figure 7:
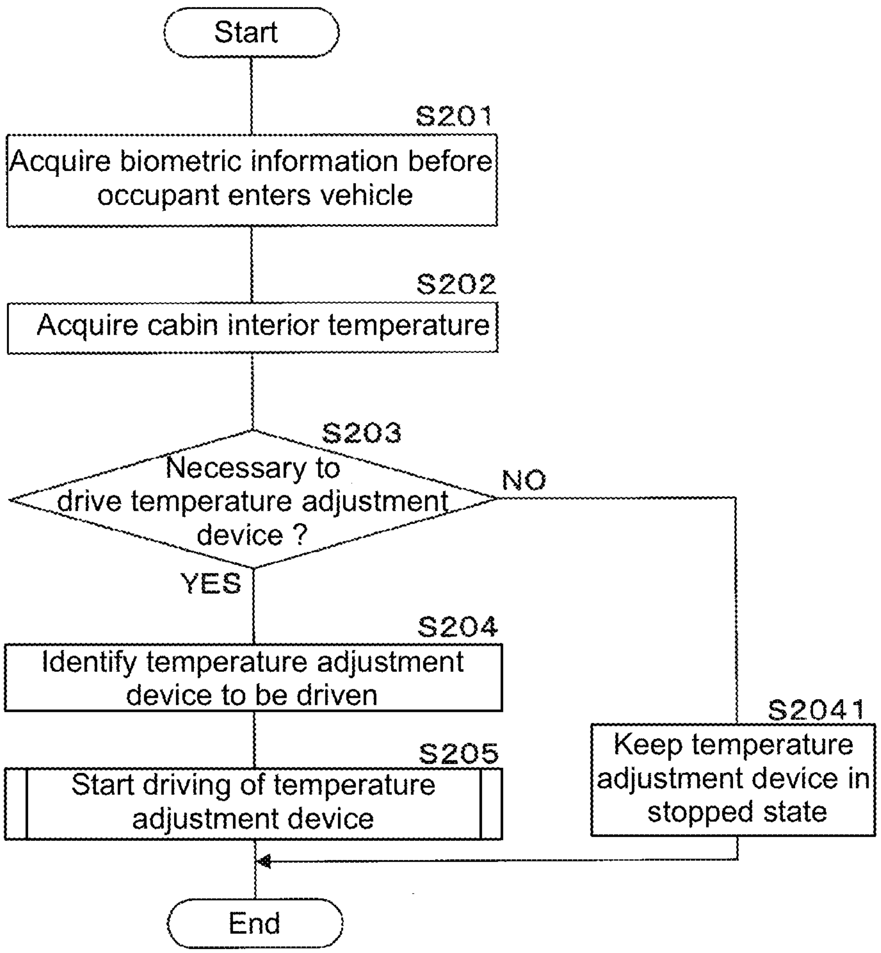
FIG. 7 is a flowchart showing processing performed by the control unit of the in-vehicle device according to a second embodiment (after a predetermined time has elapsed).

FIG. 7 is a flowchart showing processing performed by the control unit 11 of the in-vehicle device 1 according to a second embodiment (after a predetermined time has elapsed). The control unit 11 of the in-vehicle device 1 regularly performs the following processing when, for example, the vehicle CC is in the stopped state (the IG switch is off). When performing the following processing, the control unit 11 of the in-vehicle device 1 may perform verification processing with a smart key or a remote start key carried by the occupant. The control unit 11 of the in-vehicle device 1 may start up the vehicle C when the result of the verification processing is affirmative and the IG switch is turned on. When the vehicle C is started up, the engine is started, the HV system is started, or the EV system is started.

The control unit 11 of the in-vehicle device 1 acquires biometric information pertaining to an occupant who intends to enter the vehicle C before the occupant enters the vehicle C (S201). It is envisioned that an occupant who intends to enter the vehicle C may start up the vehicle C from outside the vehicle C using a remote start key or the like before entering (before riding). The remote start key can start up the vehicle C and start the driving of the temperature adjustment devices S1 by communicating with the in-vehicle device 1 using short-range wireless communication.

The mobile device 3 carried by the occupant is constituted by a combination of a remote start key and a smart watch or the like that includes the vital sensor 31, or by a remote start key that includes the vital sensor 31. For example, the remote start key may output (transmit), to the in-vehicle device 1, biometric information acquired (received) from a smart watch that includes the vital sensor 31. The control unit 11 of the in-vehicle device 1 acquires biometric information (e.g., body temperature) pertaining to the occupant who intends to enter the vehicle C from the mobile device 3 configured in this manner (a combination of a smart watch and a remote start key) before the occupant enters the vehicle C.

By acquiring the occupant's biometric information before the occupant enters the vehicle C, the control unit 11 of the in-vehicle device 1 can determine whether or not it is necessary to drive a temperature adjustment device S1 and identify (select) the type of temperature adjustment device S1 that needs to be driven (seat heater S11 or seat blower S12) before the occupant enters the vehicle C. The control unit 11 of the in-vehicle device 1 can thus start the driving of the identified (selected) device (either the seat heater S11 or the seat blower S12) before the occupant enters the vehicle or when the occupant enters the vehicle.

The control unit 11 of the in-vehicle device 1 performs the processing of steps S202 to S205 and S2041 similarly to the processing of steps S102 to S105 and S1041 in the first embodiment. When performing the processing of step S205, the control unit 11 of the in-vehicle device 1 starts the driving of the seat heater S11 or the seat blower S12 (seat ventilator) depending on the type of temperature adjustment device S1 identified (selected) as in the first embodiment. The control of the driving of the seat heater S11 or the seat blower S12 will be described with reference to the processing flow showing the corresponding subroutine.

Figure 8:
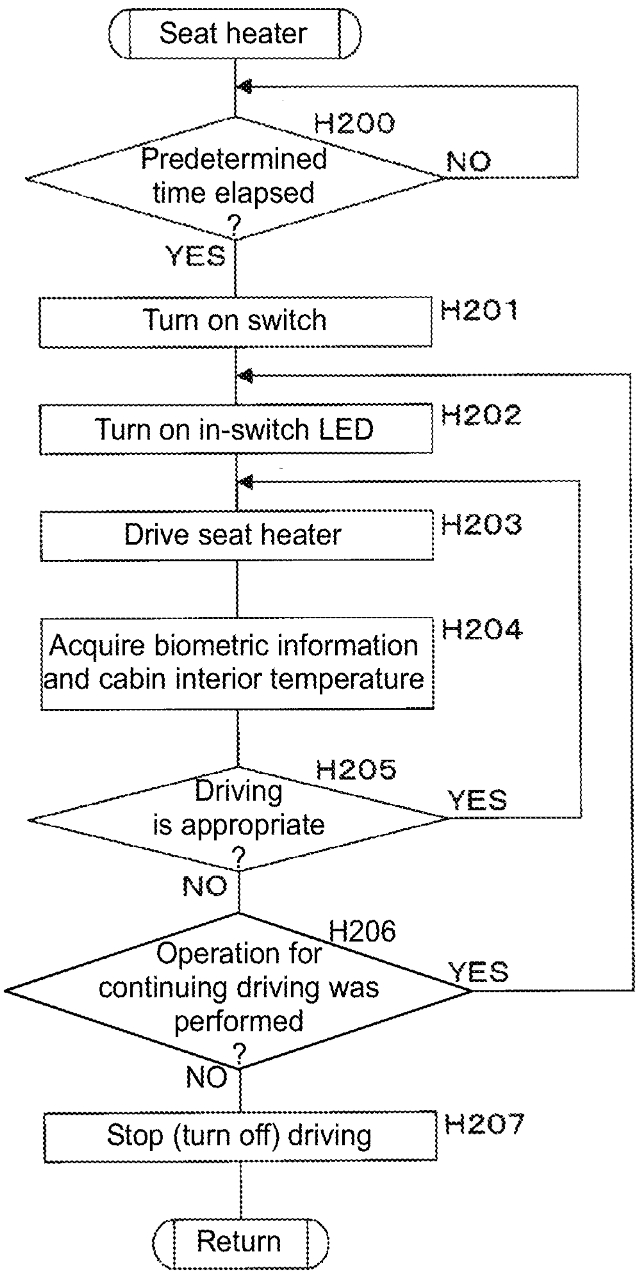
FIG. 8 is a flowchart showing processing that the control unit of the in-vehicle device performs with respect to the seat heater.

FIG. 8 is a flowchart showing processing that the control unit 11 of the in-vehicle device 1 performs with respect to the seat heater S11. Upon identifying (selecting) the seat heater S11 as the temperature adjustment device S1 to be driven, the control unit 11 of the in-vehicle device 1 executes the following processing flow.

The control unit 11 of the in-vehicle device 1 determines whether or not a predetermined time has elapsed since the biometric information was acquired (H200). A predetermined time corresponding to the seat heater S11 (predetermined time for the seat heater S11) is stored in the storage unit 12, for example. The predetermined time for the seat heater S11 may be a time determined based on an entrance time, which is the amount of time between when the occupant operates the remote start key and when the occupant enters the vehicle.

For example, the control unit 11 of the in-vehicle device 1 stores history information (log information) including an operation log indicating operation of the remote start key by the occupant and a riding log obtained according to occupancy of the driver's seat or according to a seating sensor of the vehicle seat S, and stores an entrance time calculated using such log information in the storage unit 12. The control unit 11 of the in-vehicle device 1 may store, as the entrance time, an average value calculated using a plurality of pieces of log information. The average value may be calculated based on the most recent piece of operation log information and a moving average over a predetermined number of previous pieces, such as the past five pieces.

The control unit 11 of the in-vehicle device 1 may use, as the predetermined time, a time (X−Y minutes) obtained by subtracting an initialization time (Y minutes) of the seat heater S11 from the entrance time (X minutes) calculated using the operation log in the above-described manner. The initialization time (Y minutes) of the seat heater S11 is shorter than the entrance time (X minutes), that is to say Y<X, and is based on, for example, a time (startup time) that corresponds to the time from when driving of the seat heater S11 starts to when the seat heater S11 reaches a predetermined temperature, and this time is determined according to the product characteristics of the seat heater S11. The control unit 11 of the in-vehicle device 1 has a timing function and determines whether or not the predetermined time (X−Y minutes) has elapsed since the time when the biometric information (e.g., body temperature) was acquired from the mobile device 3 constituted by the remote start key or the like.

If the predetermined time has not elapsed since the biometric information was acquired (H200: NO), the control unit 11 of the in-vehicle device 1 performs loop processing to execute the processing of step S200 again. As a result, the control unit 11 of the in-vehicle device 1 performs standby processing until the predetermined time has elapsed since the biometric information was acquired.

If the predetermined time has elapsed since the biometric information was acquired (H200: YES), the control unit 11 of the in-vehicle device 1 performs the processing of steps H201 to H207, similarly to steps H101 to H107 in the first embodiment. Moreover, the acquisition of the cabin interior temperature in step S202 may be performed in accordance with the elapse of the predetermined time.

The control unit 11 of the in-vehicle device 1 starts the control of the seat heater S11 before the occupant enters the vehicle C, based on the biometric information and the cabin interior temperature (ambient temperature) that were acquired before the occupant enters the vehicle C. As a result, when the occupant enters the vehicle C, the seat heater S11 is already driven, thus making it possible to provide the occupant with a heated vehicle seat S environment and improve comfort in the vehicle cabin. The time when the seat heater S11 starts to be driven is determined based on the entrance time (X minutes) calculated using the operation log and the initialization time (Y minutes) of the seat heater S11. Accordingly, it is possible to optimize the time for which the seat heater S11 is driven before the occupant enters the vehicle, so as to suppress excessive driving of the seat heater S11 and reduce the power consumption of the seat heater S11.

Figure 9:
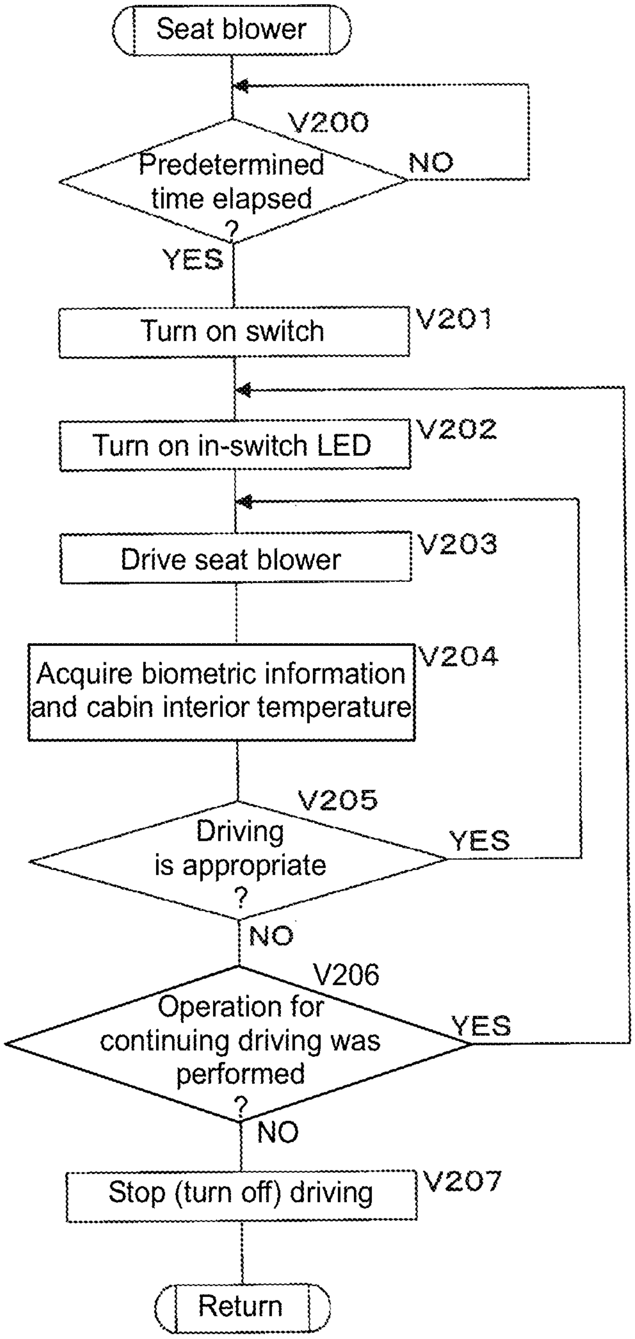
FIG. 9 is a flowchart showing processing that the control unit of the in-vehicle device performs with respect to the seat blower.

FIG. 9 is a flowchart showing processing that the control unit 11 of the in-vehicle device 1 performs with respect to the seat blower S12. Upon identifying (selecting) the seat blower S12 (seat ventilator) as the temperature adjustment device S1 to be driven, the control unit 11 of the in-vehicle device 1 executes the following processing flow.

The control unit 11 of the in-vehicle device 1 determines whether or not a predetermined time has elapsed since the biometric information was acquired (V200). A predetermined time corresponding to the seat blower S12 (predetermined time for the seat blower S12) is stored in the storage unit 12, for example. The predetermined time for the seat blower S12 may be a time determined based on an entrance time, which is the amount of time between when the occupant operates the remote start key and when the occupant enters the vehicle. The entrance time (X minutes) is calculated based on an operation log or the like and stored in the storage unit 12, similarly to the case of the seat heater S11 described above. The control unit 11 of the in-vehicle device 1 may use the entrance time (X minutes) calculated using the operation log in this way as the predetermined time.

The control unit 11 of the in-vehicle device 1 has a timing function and determines whether or not the predetermined time (X minutes) has elapsed since the time when the biometric information (e.g., body temperature) was acquired from the mobile device 3 constituted by the remote start key or the like. If the predetermined time has not elapsed since the biometric information was acquired (V200: NO), the control unit 11 of the in-vehicle device 1 performs loop processing to execute the processing of step V200 again. As a result, the control unit 11 of the in-vehicle device 1 performs standby processing until the predetermined time has elapsed since the biometric information was acquired.

If the predetermined time has elapsed since the biometric information was acquired (V200: YES), the control unit 11 of the in-vehicle device 1 performs the processing of steps V201 to V207, similarly to steps V101 to V107 in the first embodiment. Moreover, the acquisition of the cabin interior temperature in step S202 may be performed in accordance with the elapse of the predetermined time.

The control unit 11 of the in-vehicle device 1 starts the control of the seat blower S12 (seat ventilator) before the occupant enters the vehicle C, based on the biometric information and the cabin interior temperature (ambient temperature) that were acquired before the occupant enters the vehicle C. As a result, when the occupant enters the vehicle C, the seat blower S12 is already driven, thus making it possible to provide the occupant with a ventilated vehicle seat S environment and improve comfort in the vehicle cabin. The time when the seat blower S12 starts to be driven is determined based on the entrance time (X minutes) calculated using the operation log. Accordingly, it is possible to optimize the time for which the seat blower S12 is driven before the occupant enters the vehicle, so as to suppress excessive driving of the seat blower S12 and reduce the power consumption of the seat blower S12.

Third Embodiment

Figure 10:
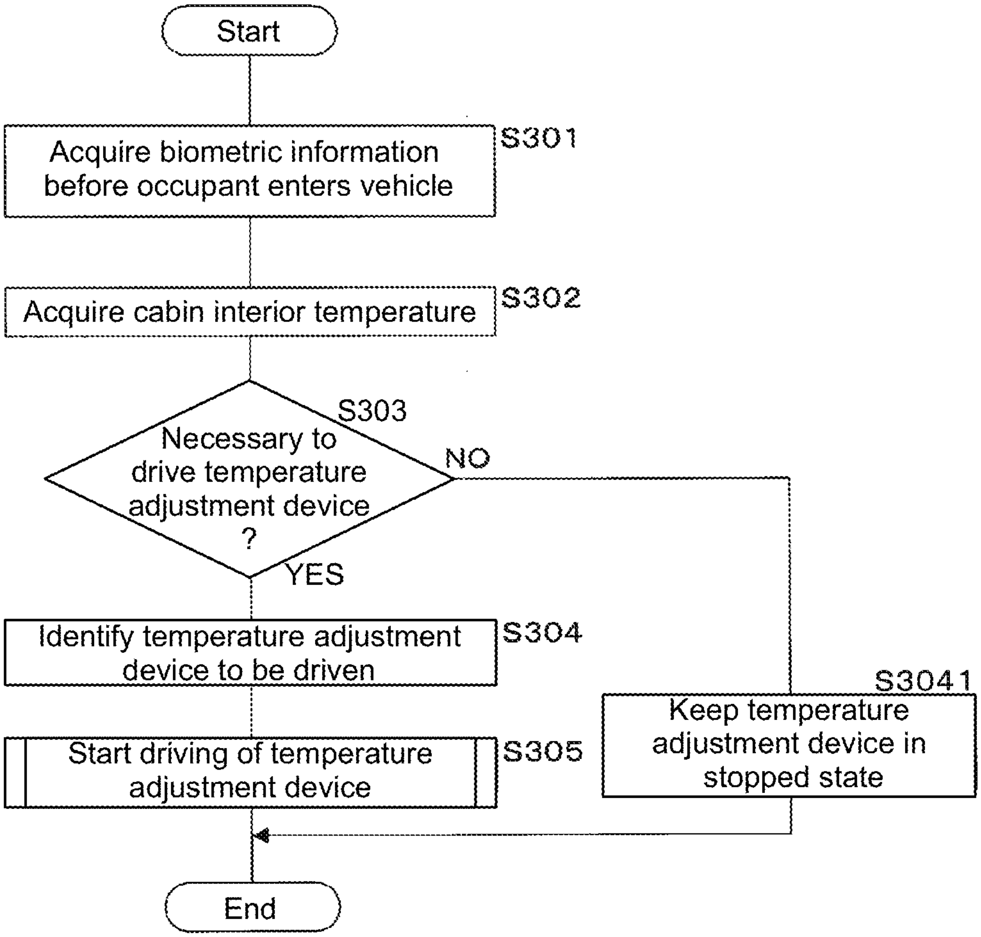
FIG. 10 is a flowchart showing processing performed by the control unit of the in-vehicle device according to a third embodiment (first set temperature).

FIG. 10 is a flowchart showing processing performed by the control unit 11 of the in-vehicle device 1 according to a third embodiment (first set temperature). The control unit 11 of the in-vehicle device 1 performs the processing of steps S301 to S305 and S3041 similarly to steps S201 to S205 and S2041 in the second embodiment.

As in the second embodiment, the control unit 11 of the in-vehicle device 1 acquires biometric information (e.g., body temperature) pertaining to an occupant who intends to enter the vehicle C from the mobile device 3 constituted by a remote start key or the like, before the occupant enters the vehicle C (S301). The control unit 11 of the in-vehicle device 1 performs the series of processing shown in this flowchart based on the biometric information (e.g., body temperature) and the cabin interior temperature (ambient temperature) there were acquired before the occupant enters the vehicle.

In this processing, when the seat heater S11 is identified (selected) in the processing of step S304, the control unit 11 of the in-vehicle device 1 performs processing different from that of the second embodiment. When the seat blower S12 is identified (selected) in the processing of step S304, the control unit 11 of the in-vehicle device 1 may perform processing similar to that of the first embodiment.

Figure 11:
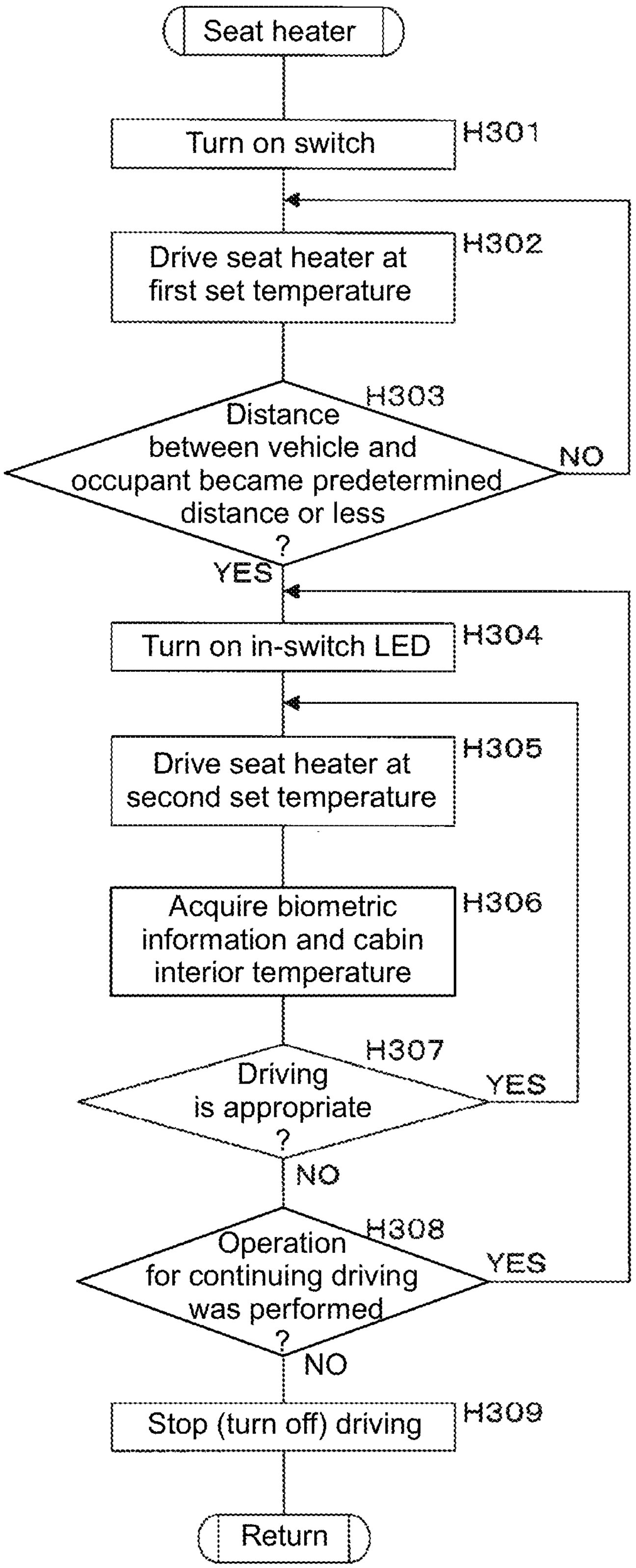
FIG. 11 is a flowchart showing processing that the control unit of the in-vehicle device performs with respect to the seat heater.

FIG. 11 is a flowchart showing processing performed by the control unit 11 of the in-vehicle device 1 with respect to the seat heater S11. Upon identifying (selecting) the seat heater S11 as the temperature adjustment device S1 to be driven, the control unit 11 of the in-vehicle device 1 executes the following processing flow. The control unit 11 of the in-vehicle device 1 performs the processing of step H301 similarly to step H101 in the first embodiment.

The control unit 11 of the in-vehicle device 1 drives the seat heater S11 at a first set temperature (H302). The control unit 11 of the in-vehicle device 1 transmits a control signal corresponding to the first set temperature to the seat heater S11. The control signal corresponding to the first set temperature is, for example, a control signal for controlling the seat heater S11 such that the surface temperature of the vehicle seat S reaches the first set temperature.

The seat heater S11 is driven at the first set temperature in accordance with the control signal transmitted from the control unit 11 of the in-vehicle device 1, and thus the heating (temperature adjustment) of the vehicle seat S is started at the first set temperature. When driving the seat heater S11 at the first set temperature, the control unit 11 of the in-vehicle device 1 may turn on in-switch LEDs of the seat heater S11, similarly to step H102 in the first embodiment.

The control unit 11 of the in-vehicle device 1 determines whether or not the distance between the vehicle C and the occupant is a predetermined distance or less (H303). The control unit 11 of the in-vehicle device 1 periodically acquires the distance between the occupant and the vehicle C by detecting, at a predetermined cycle, the position of the mobile device 3, which includes a smart watch or a remote start key or the like, carried by the occupant. The control unit 11 of the in-vehicle device 1 may detect the position of the mobile device 3 by utilizing, for example, a response function of the remote start key using LF waves or the like, a beacon system, or location detection performed using UWB (Ultra Wide Band). Alternatively, the control unit 11 of the in-vehicle device 1 may periodically or regularly communicate with a body ECU or the like that periodically derives the distance between the vehicle C and the mobile device 3 (smart key or the like) carried by the occupant, and periodically acquire the distance between the vehicle C and the occupant from the body ECU or the like.

The predetermined distance that serves as a threshold for making the determination is stored in a predetermined storage area accessible by the control unit 11, such as the storage unit 12 of the in-vehicle device 1, for example. For example, in the case where the predetermined distance is set to 10 meters (stored in the storage unit 12), if the distance between the vehicle C and the occupant is 10 meters or less, the control unit 11 of the in-vehicle device 1 determines that the distance between the vehicle C and the occupant is the predetermined distance or less. Upon determining that the distance between the vehicle C and the occupant is not the predetermined distance or less (H303: NO), the control unit 11 of the in-vehicle device 1 performs the processing of step S302 again to keep the seat heater S11 in a state of being driven at the first set temperature.

Upon determining that the distance between the vehicle C and the occupant is the predetermined distance or less (H303: YES), the control unit 11 of the in-vehicle device 1 turns on a predetermined number of in-switch LEDs of the seat heater S11 (H304). The control unit 11 of the in-vehicle device 1 turns on the in-switch LEDs of the seat heater S11 similarly to the processing of H102 of the first embodiment.

The control unit 11 of the in-vehicle device 1 drives the seat heater S11 at a second set temperature (H305). When it is determined that the distance between the vehicle C and the occupant is the predetermined distance or less, the control unit 11 of the in-vehicle device 1 increases (raises) the output of the seat heater S11 and controls the seat heater S11 so as to reach a second set temperature that is higher than the first set temperature.

The control unit 11 of the in-vehicle device 1 transmits a control signal corresponding to the second set temperature to the seat heater S11. The control signal corresponding to the second set temperature is, for example, a control signal for controlling the seat heater S11 such that the surface temperature of the vehicle seat S reaches the second set temperature. The second set temperature is a set temperature higher than the first set temperature, and the vehicle seat S can be heated to a higher temperature.

The seat heater S11 is driven at the second set temperature in response to the control signal transmitted from the control unit 11 of the in-vehicle device 1, and thus heating (temperature adjustment) of the vehicle seat S is started at the second set temperature. The control unit 11 of the in-vehicle device 1 may turn on in-switch LEDs of the seat heater S11, similarly to step H102 in the first embodiment, when driving the seat heater S11 at the second set temperature.

The control unit 11 of the in-vehicle device 1 performs the processing of steps H306 to H309 similarly to steps H104 to H107 in the first embodiment.

The control unit 11 of the in-vehicle device 1 controls the driving of the seat heater S11 using set temperature steps including the first set temperature and the second set temperature. Before the occupant enters the vehicle C, the seat heater S11 is driven at the first set temperature immediately after the vehicle C is started using the remote start key, thereby making it possible to start the heating of the vehicle seat S while also suppressing power consumption of the seat heater S11. Furthermore, when the occupant approaches the vehicle C (is the predetermined distance or closer), the set temperature is raised from the first set temperature to the second set temperature, thereby making it possible to provide the occupant with an in-vehicle environment with an appropriately adjusted temperature, and making it possible to improve comfort within the vehicle cabin. In the present embodiment, the control unit 11 of the in-vehicle device 1 controls the driving of the seat heater S11 using two set temperature steps including the first set temperature and the second set temperature, but the present disclosure is not limited to this. A configuration is possible in which the control unit 11 of the in-vehicle device 1 sets a plurality of thresholds (e.g., a first predetermined distance and a second predetermined distance) for the predetermined distance for determining the distance between the vehicle C and the occupant, and controls the driving of the seat heater S11 in a stepwise manner using three or more set temperature steps according to the distance thresholds (e.g., the first predetermined distance and the second predetermined distance).

The embodiments disclosed herein are intended to be considered in all respects as illustrative and not restrictive. The scope of the present disclosure is defined by the claims, not by the above meaning, and is intended to include all modifications within the meaning and scope of the claims.

The claims set forth in the claims can be combined with each other, regardless of the form of reference. The claims may contain multiple dependent claims which are dependent on multiple other claims. Multiple dependent claims may be drawn up which depend on multiple dependent claims. If a multiple dependent claim dependent on a multiple dependent claim is not presented, this does not limit the presentation of the multiple dependent claim dependent on the multiple dependent claim.

The invention claimed is:

1. An in-vehicle device to be installed in a vehicle and comprising a control unit configured to control a temperature adjustment device provided in a vehicle seat,
- wherein the control unit acquires biometric information pertaining to an occupant of the vehicle, acquires a cabin interior temperature of the vehicle, and controls the temperature adjustment device based on the biometric information and the cabin interior temperature that were acquired,
- there are a plurality of the temperature adjustment devices, including a seat heater configured to raise a surface temperature of the vehicle seat and a seat blower configured to blow air through a surface of the vehicle seat,
- the control unit identifies, based on a combination of the biometric information and the cabin interior temperature that were acquired, either one of the seat heater and the seat blower, as the temperature adjustment device to be controlled,
- the biometric information includes a body temperature of the occupant,
- in a case where the body temperature of the occupant is a first body temperature threshold or more and the cabin interior temperature is a first cabin temperature threshold or more, the control unit drives the seat blower,
- in a case where the body temperature of the occupant is a second body temperature threshold or less and the cabin interior temperature is a second cabin temperature threshold or less, the control unit drives the seat heater,
- the second body temperature threshold is less than the first body temperature threshold, and
- the second cabin temperature threshold is less than the first cabin temperature threshold.

2. The in-vehicle device according to claim 1,
- wherein in a case where the body temperature of the occupant is greater than the second body temperature threshold and less than the first body temperature threshold, and furthermore the cabin interior temperature is greater than the second cabin temperature threshold and less than the first cabin temperature threshold, the control unit stops the temperature adjustment device.

3. The in-vehicle device according to claim 1,
- wherein before the occupant enters the vehicle, the control unit acquires the biometric information from a mobile device in possession of the occupant and starts control of the temperature adjustment device based on the biometric information and the cabin interior temperature that were acquired.

4. The in-vehicle device according to claim 3,
- wherein after a predetermined time elapses since the biometric information was acquired, the control unit starts control of the temperature adjustment device based on the biometric information and the cabin interior temperature that were acquired.

5. The in-vehicle device according to claim 3,
- wherein the temperature adjustment device includes a seat heater configured to raise a surface temperature of the vehicle seat,
- the control unit controls the seat heater such that the surface temperature of the vehicle seat reaches a first set temperature, and
- in a case where a distance between the vehicle and the occupant becomes a predetermined distance or less, the control unit controls the seat heater such that the surface temperature of the vehicle seat reaches a second set temperature higher than the first set temperature.

6. A non-transitory program that causes a computer to perform processing, the computer being installed in a vehicle and configured to control a temperature adjustment device provided in a vehicle seat, the processing including:
- acquiring biometric information pertaining to an occupant of the vehicle;
- acquiring a cabin interior temperature of the vehicle; and
- controlling the temperature adjustment device based on the biometric information and the cabin interior temperature that were acquired, wherein there are a plurality of the temperature adjustment devices, including a seat heater configured to raise a surface temperature of the vehicle seat and a seat blower configured to blow air through a surface of the vehicle seat,
- the program further causes the computer to identify, based on a combination of the biometric information and the cabin interior temperature that were acquired, either one of the seat heater and the seat blower, as the temperature adjustment device to be controlled, the biometric information includes a body temperature of the occupant, the program further causes the computer to perform processing of:

in a case where the body temperature of the occupant is a first body temperature threshold or more and the cabin interior temperature is a first cabin temperature threshold or more, driving the seat blower; and in a case where the body temperature of the occupant is a second body temperature threshold or less and the cabin interior temperature is a second cabin temperature threshold or less, driving the seat heater, the second body temperature threshold is less than the first body temperature threshold, and the second cabin temperature threshold is less than the first cabin temperature threshold.

7. An information processing method that causes a computer to perform processing, the computer being installed in a vehicle and configured to control a temperature adjustment device provided in a vehicle seat, the processing including:

acquiring biometric information pertaining to an occupant of the vehicle;

acquiring a cabin interior temperature of the vehicle; and controlling the temperature adjustment device based on the biometric information and the cabin interior temperature that were acquired, wherein there are a plurality of the temperature adjustment devices, including a seat heater configured to raise a surface temperature of the vehicle seat and a seat blower configured to blow air through a surface of the vehicle seat, the information processing method further causes the computer to identify, based on a combination of the biometric information and the cabin interior temperature that were acquired, either one of the seat heater and the seat blower, as the temperature adjustment device to be controlled, the biometric information includes a body temperature of the occupant, the information processing method further causes the computer to perform processing of:

in a case where the body temperature of the occupant is a first body temperature threshold or more and the cabin interior temperature is a first cabin temperature threshold or more, driving the seat blower; and in a case where the body temperature of the occupant is a second body temperature threshold or less and the cabin interior temperature is a second cabin temperature threshold or less, driving the seat heater, the second body temperature threshold is less than the first body temperature threshold, and the second cabin temperature threshold is less than the first cabin temperature threshold.

* * * * *